US008566529B2

(12) United States Patent
Hutton et al.

(10) Patent No.: US 8,566,529 B2
(45) Date of Patent: Oct. 22, 2013

(54) METHOD, SYSTEM AND COMPUTER PROGRAM PRODUCT FOR GENERALIZED LRU IN CACHE AND MEMORY PERFORMANCE ANALYSIS AND MODELING

(75) Inventors: David S. Hutton, Tallahassee, FL (US); Keith N. Langston, Woodstock, NY (US); Kathryn M. Jackson, Poughkeepsie, NY (US); Hanno Ulrich, Tuebingen (DE); Craig R. Walters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1653 days.

(21) Appl. No.: 12/030,501

(22) Filed: Feb. 13, 2008

(65) Prior Publication Data

US 2009/0204767 A1   Aug. 13, 2009

(51) Int. Cl.
*G06F 12/00* (2006.01)
*G06F 13/00* (2006.01)
*G06F 13/28* (2006.01)
*G06F 9/44* (2006.01)
*G06F 13/10* (2006.01)
*G06F 13/12* (2006.01)

(52) U.S. Cl.
USPC ............................................ 711/136; 703/21

(58) Field of Classification Search
None
See application file for complete search history.

(56) References Cited

U.S. PATENT DOCUMENTS

| 6,122,691 | A  | 9/2000  | Arimilli et al. |
| 6,434,670 | B1 | 8/2002  | Arimilli et al. |
| 6,748,491 | B2 | 6/2004  | Rodriguez |
| 2005/0283573 | A1 | 12/2005 | Mewhinney et al. |
| 2007/0250667 | A1 | 10/2007 | Dement et al. |

OTHER PUBLICATIONS

Sugumar et al., Efficient Simulation of Caches under Optimal Replacement with Applications to Miss Characterization, 1993, ACM, 12 pages.*
Austin, Todd, Simple Scalar Hacker's Guide, May 2003, SimpleScalar LLC, 92 pages.*
Fraguela, et al., "Modeling Set Associative Caches Behavior for Irregular Computations", Department de Arquitectura de Computadores Univ. de Malaga (Spain), 10 pages.
Kampe, et al., "Self-Correcting LRU Replacement Polices", Departing of Computer Engineering Chalmers University of Technology Gotenborg, Sweden, 10 pages.
International Business Machines Corporation (IBM), z/Architecture Principles of Operations, Sixth Edition (Apr. 2007), 1216 pages (split into 4 parts).

* cited by examiner

*Primary Examiner* — Christian P Chace
*Assistant Examiner* — Gary W Cygiel
(74) *Attorney, Agent, or Firm* — Cantor Colburn LLP; John Campbell

(57) ABSTRACT

The exemplary embodiment of the present invention relates to a generalized LRU algorithm is provided that is associated with a specified cache associativity line set value that is determined by a system user. As configured, the LRU algorithm as presented can comprise n-levels for an LRU tree, each specified tree being individually analyzed within the LRU algorithm. Within each LRU tree level comprises the associativity line value can be further broken down into sub-analysis groups of any desired configuration, however, the total sub-analysis group configuration must equal the specified cache associativity line value.

16 Claims, 2 Drawing Sheets

METHOD, SYSTEM AND COMPUTER PROGRAM PRODUCT FOR GENERALIZED LRU IN CACHE AND MEMORY PERFORMANCE ANALYSIS AND MODELING

BACKGROUND OF THE INVENTION

This invention relates generally to cache replacement algorithms, and more particularly to providing a generalized least recently used algorithm that accepts visually-intuitive configuration input, implemented for the purpose of cache performance analysis.

Cache algorithms (or replacement algorithms) are information optimizing instructions that that are implemented within computing systems for the management of stored cache information. Since cache sizes are usually limited by design when a cache is full algorithms are utilized to ascertain which cache items are to be discarded in order to make room for new items. To ensure the optimized performance of a cache it is desirable to have a cache algorithm discard any items that are least likely to be utilized for the longest period of time in the future.

A least recently used (LRU) algorithm is an example of a replacement algorithm that discards the least recently used item first within a cache. In general, a LRU replacement algorithm monitors and maintains age bits for cache lines and through the use of these age bits, it selects the least recently used line within a cache. Functionally, in the event that a cache line is used then the age-bits for every other associated cache line is changed. LRU algorithms implemented for line replacement for each level of cache are tailored to a specific cache design. Therefore, a cache performance model must readily implement any standard or non-standard LRU scheme in order to identify the optimal implementation for a given design, and further, be capable of reporting how far an implemented scheme is from ideal.

BRIEF SUMMARY OF THE INVENTION

An exemplary embodiment includes a method for cache and memory performance analysis and modeling. The method comprises receiving a cache-line set associative parameter input value, receiving input values in regard to a number of LRU-tree levels that are to be analyzed and receiving input values in regard to a number of LRU-analysis groups per LRU-tree level into which a cache-line set is to be divided. The method also comprises determining if a total of the input values for the LRU-analysis groups per LRU-tree level for a cache-line set is equal to the cache-line set-associative parameter input value and identifying the analysis group within a cache-line set that comprises an oldest MRU for all but a root level of the LRU-tree. The method also comprises identifying a LRU set-index within a root level analysis group comprising the oldest MRU within a preceding parent LRU-tree level and returning a LRU set-index for replacement that is identified by a true-LRU that is retrieved from the root level analysis group.

Another exemplary embodiment includes a computer program product that includes a computer readable medium useable by a processor, the medium having stored thereon a sequence of instructions which, when executed by the processor, causes the processor to perform a cache and memory analysis and modeling operation. The computer program product performs the operations of receiving a cache-line set associative parameter input value, receiving input values in regard to a number of LRU-tree levels that are to be analyzed, and receiving input values in regard to a number of LRU-analysis groups per LRU-tree level into which a cache-line set is to be divided. The computer program product also determines if a total of the input values for the analysis groups per LRU-tree level for a cache-line set is equal to the cache-line set associative parameter input value, identifies the analysis group within a cache-line set that comprises an oldest MRU for all but a root level of the LRU-tree, and identifies a LRU set-index within a root level analysis group comprising the oldest MRU within a preceding parent LRU-tree level, and returns a LRU set-index for replacement that is identified by a true-LRU that is retrieved from the root level analysis group.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Aspects of the exemplary embodiment of the present invention can be implemented within a conventional computing system environment comprising hardware and software elements. The methodologies of the present invention can further be implemented to program a conventional computer system in order to provide software emulation of the prescribed tasks of the present invention as described below.

An aspect of the exemplary embodiment of the present invention provides a GUI that is displayed at a display device comprised within a computing system. The GUI is provided in order to allow a system user to enter input parameter values that will be utilized in accordance with the prescribed methodology and computer program product of the exemplary embodiment of the present invention. Further, output results from the executed operations of the methodology and computer program product are displayed to the system user to serve as an aid to the user within any performance modeling or analysis operations.

Within the exemplary embodiment a LRU algorithm is provided that is associated with a specified cache associativity line set value that is determined by a system user. As configured, the LRU algorithm as presented can comprise n-levels for an LRU tree, each specified level of the LRU tree being individually analyzed within the LRU algorithm. Within each LRU tree level the associativity line value can be further broken down into sub-analysis groups of any desired configuration, however, the total number of sub-analysis groups must equal the specified cache associativity line set value. For example, a user specified associativity line set value of 9 may be further decomposed to a LRU tree level to comprise sub-analysis groupings of three groups of 3 line sets, thus adding to a total of 9 line sets. A further LRU tree level may comprise two sub-analysis groups of the line set values 6 and 3.

Within an exemplary embodiment a user operating a computing system will be queried at a GUI (not shown) prompt to enter an initial associativity line set value for a cache and memory performance analysis and modeling operation. Once the user's input response is received, the user will then be prompted to enter a number of LRU tree analysis levels that the user desires to analyze. Upon reception of this input information, the system will then query the user via the GUI in regard to the sub-group analysis configuration for each specified LRU tree level that the user previously requested. Thus, the user is capable of implementing any LRU scheme configuration within a performance model since the user has the capability to change the representation of the present parameterized LRU tree analysis model.

Figure 1:
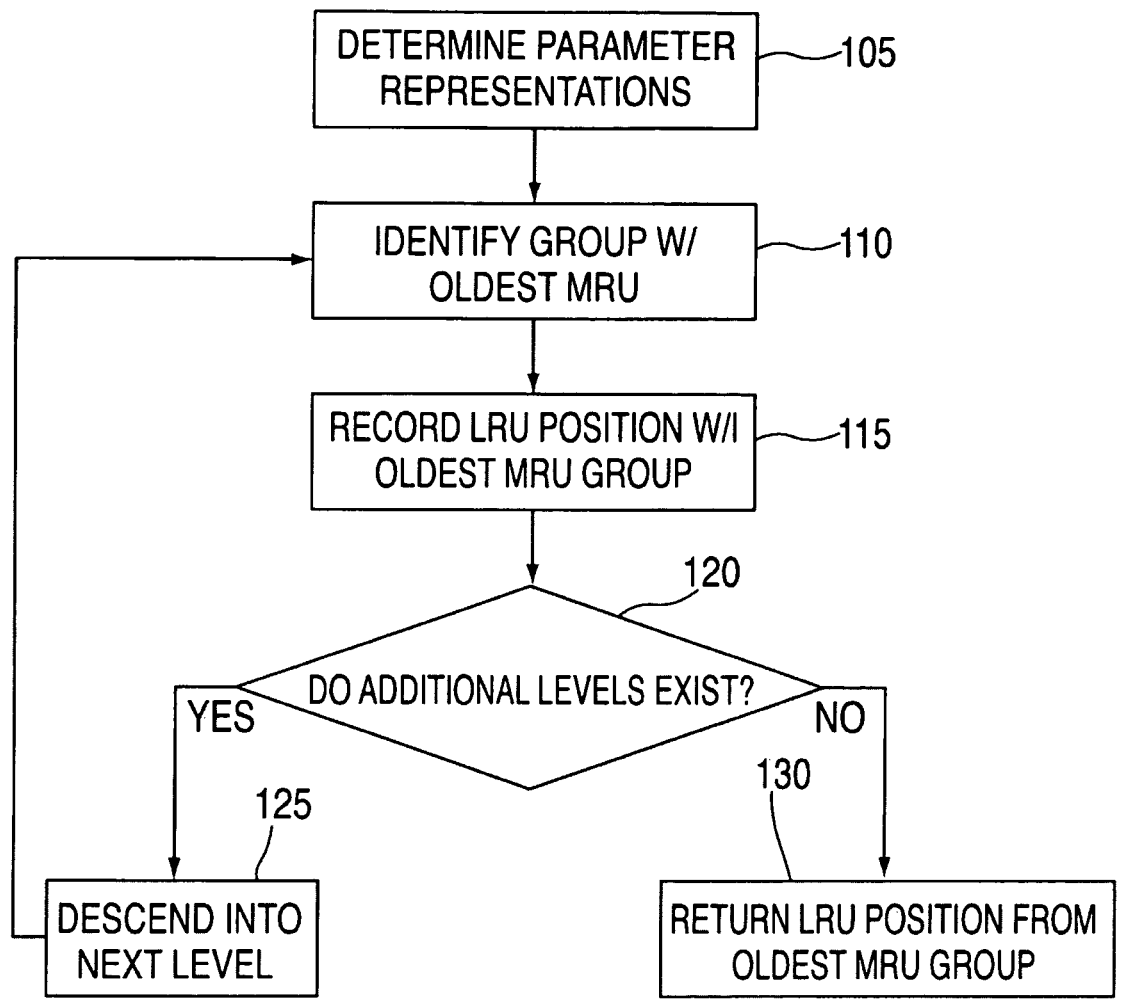
FIG. 1 is a flowchart detailing a method for implementing a LRU in cache and memory performance analysis and modeling operation in accordance with an exemplary embodiment of the present invention.

As shown in the accordance with the flow diagram of FIG. 1, in general once the parameters value have been input by the user (step 105), the LRU algorithm utilizes the parameter values to identify the target cache line sets and the analysis group of a LRU tree level that contains the oldest most recently used (MRU) item (step 110). Next, the position of the LRU item within the MRU group is identified and recorded (step 115). Within the algorithm a determination is made to if additional LRU tree levels exist that are required to be analyzed (step 120). If additional LRU tree levels are specified, then the LRU identification/position recording procedure is repeated for the next LRU tree level (step 125). In the instance that no additional LRU tree levels are required to be analyzed, then the identified LRU position from the oldest MRU group is returned and subsequently reported to the system user at the GUI as being the associativity slot that has been identified for replacement.

As mentioned above, the parameter representation for LRU tree analysis groups and LRU tree levels entails the listing of the groups and the group sizes of the various LRU tree levels. For example, the scheme as shown in table 1 comprises two LRU tree levels respectively of analysis grouping sets of 4, 4, 4, 4 and 2, 2, 2, 2, 2, 2, 2, 2 cache line sets. An exemplary table such as Table 1 can be displayed to a user at a computing system via a GUI as a result of the user's entry of the requested parameter information.

TABLE 1 lruLvl[1] (4) (4) (4) (4)
lruLvl[2] (2) (2) (2) (2) (2) (2) (2) (2)

Within this scheme, visually it can easily be visually ascertained that a target cache has an associativity line set value of 16; with the first level in the LRU tree comprising four groups of 4 line sets, and the second level of the LRU tree comprising eight groups of 2 line sets. Further, a check of the associativity value for each tree level can easily be visually ascertained from viewing the displayed LRU tree table.

Similarly Table 2 is shown to have an associativity line set value of 12, as determined from a review of the displayed table values. As shown, the first level of the two level LRU tree comprises four groups of 3 line sets. The second level of the LRU tree comprises the four groups of 3 line sets further decomposed into four groups, the groups being split into groups of 2 and 1 line set values.

TABLE 2 lruLvl[1] (3) (3) (3) (3)
lruLvl[2] (2 1) (2 1) (2 1) (2 1)

Table 3 shows an example of a true-LRU operation that has been performed on each line set of a 16 line-wide cache.

TABLE 3 lruLvl[1] (1) (1) (1) (1) (1) (1) (1) (1) (1) (1) (1) (1) (1) (1) (1) (1)

Table 4 shows an example of a configuration of an irregularly specified LRU tree. As shown in Table 4, the LRU tree comprises branches of different lengths and depths. This is an erroneous configuration. Within the exemplary embodiment, a user must redundantly cascade the shorter branches such that all of the LRU tree branches are of equal length and depth. Within the exemplary LRU tree shown in Table 4, at the first LRU tree level there are five groups of 4 line sets that have been specified for analysis. At the second LRU tree level each of the specified groupings of the first LRU tree level have been respectively decomposed into five groupings of 3 and 1 line set specifications. However, at the third level of the LRU tree only the five groupings of the specified 3 line sets have been further decomposed into groups of 2 and 1 line set values. This configuration is improper and cannot result in an accurate assessment of an associativity slot that is to be identified, for replacement when performing LRU analysis on the incompletely-specified root level analysis level.

TABLE 4 lruLvl[1] (4) (4) (4) (4) (4)
lruLvl[2] (3 1) (3 1) (3 1) (3 1) (3 1)
lruLvl[3] (2 1) (2 1) (2 1) (2 1) (2 1)

The specified LRU tree configuration of Table 5 shows the proper format for a user to specify the decomposition of LRU tree level groups from groups that are comprised within preceding LRU tree levels. As shown in Table 5, each respective group of 4 line sets is decomposed into a group of 3 and 1 line sets. The groups of 3 line sets within the group of 3 and 1 line set groupings are further decomposed into 2 and 1 line sets, therefore the 3 and 1 line set groupings are decomposed into a line set grouping of 2, 1, and 1 line sets.

TABLE 5 lruLvl[1] (4) (4) (4) (4) (4)
lruLvl[2] (3 1) (3 1) (3 1) (3 1) (3 1)
lruLvl[3] (2 1)(1) (2 1)(1) (2 1)(1) (2 1)(1) (2 1)(1)

Figure 2:
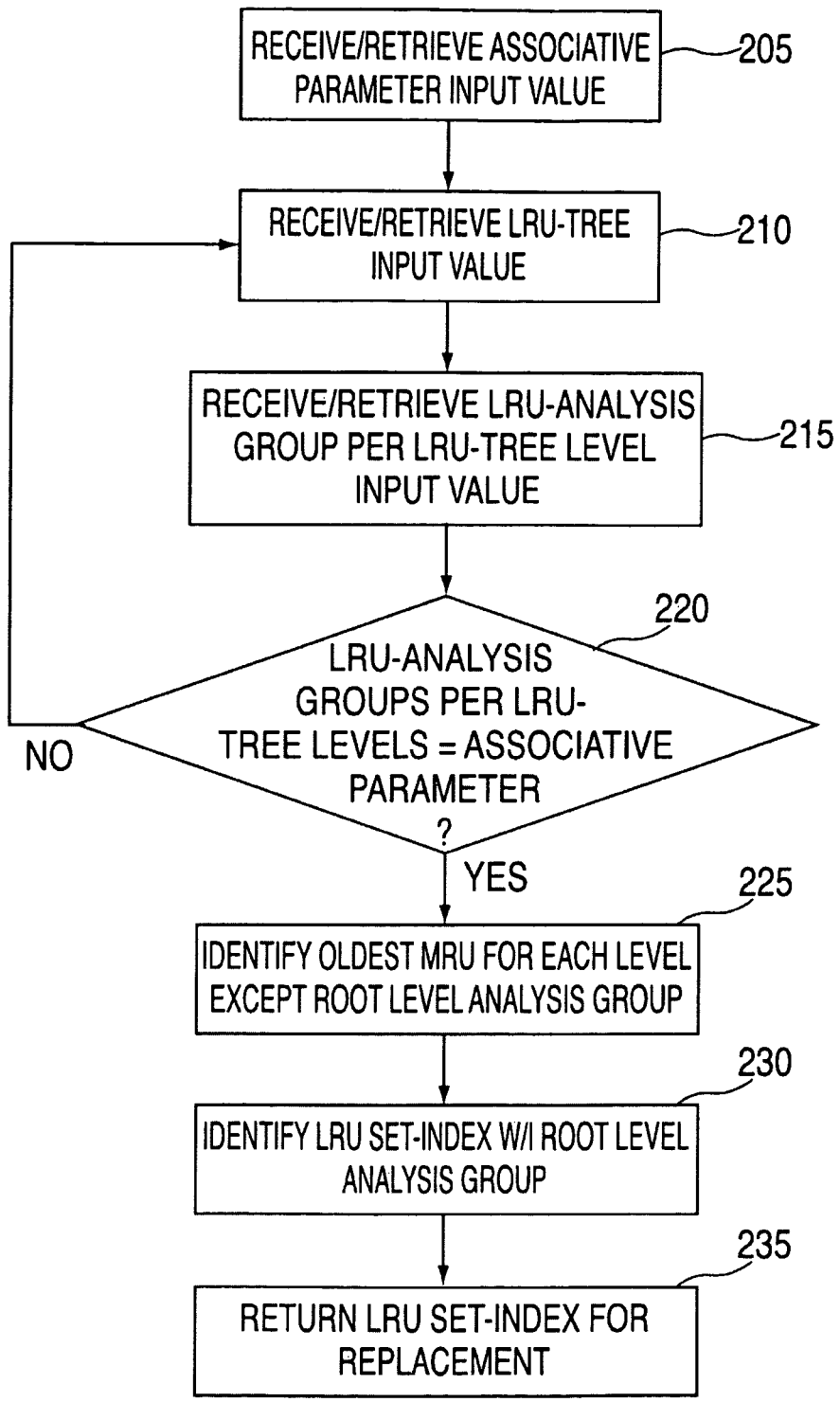
FIG. 2 is a flowchart detailing a method for performing a LRU operation in accordance with an exemplary embodiment of the present invention.

FIG. 2 shows a flow diagram illustrating a method for cache and memory performance analysis and modeling in accordance with the exemplary embodiment of the present invention. At a step 205, an associative parameter line set input value is input by a user to a computing system, the associative parameter value being used to define the number of cache line sets that are to be analyzed within the performance analysis and modeling operation. Next, at steps 210 and 215, the user will respectively input information specifying a number of LRU tree levels that are desired to be analyzed and the configuration of the line set analysis sub-groups that will be comprised within each LRU tree level.

At step 220 a determination is made regarding each specified LRU tree level to if the total number of line set analysis groups that have been identified within a LRU tree level are equal to the specified associative parameter line set input value. Next, at step 225, each line set analysis group within a cache line set that comprises an oldest MRU is identified for a LRU tree level. Further, the sub-group that is associated with the group of the identified MRU is analyzed within a differing LRU tree level for all LRU tree levels except the specified root level LRU tree level. Within the exemplary embodiment the root level LRU tree level is the final level of a decomposed LRU-tree; that is in the instance that a LRU-tree comprises at least one parent LRU-tree level that is associated with a child LRU-tree root level. Thus, from a topdown analysis perspective the analysis group comprising the oldest MRU group and the LRU position within the MRU group is identified for a first level LRU tree level, and thereafter the oldest MRU group and LRU position for each decomposed sub-group of the identified MRU is identified and recorded. Lastly, at step 230 the LRU set-index position within the root level analysis group that is decomposed from oldest MRU group identified within a preceding parent LRU-tree level is identified. Thereafter, the LRU set-index position for replacement that is identified by a true-LRU that is retrieved from the root level analysis group is returned.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for cache and memory performance analysis and modeling, the method comprising:
   receiving a cache-line set associative parameter input value;
   receiving input values in regard to a number of least recently used (LRU) tree levels that are to be analyzed;
   receiving input values in regard to a number of LRU-analysis groups per LRU tree level into which a cache-line set is to be divided;
   determining whether a total of the input values for the LRU-analysis groups per LRU tree level for a cache-line set is equal to the cache-line set associative parameter input value;
   identifying an analysis group within a cache-line set for an LRU tree level of a plurality of tree levels, the cache line set comprises an oldest most recently used (MRU) for all but a root level of the LRU tree, the identifying of the analysis group based on the total of the input values for the LRU-analysis groups per LRU tree level for the cache-line set being equal to the cache-line set associative parameter input value;
   identifying a LRU set-index within a root level analysis group comprising the oldest MRU within a preceding parent LRU-tree level of the plurality of tree levels; and
   returning a LRU set-index for replacement that is identified by a true-LRU that is retrieved from the root level analysis group.

2. The method of claim 1, wherein the root level is the final level of the LRU tree based on the LRU tree comprising at least one parent LRU-tree level that is associated with the LRU tree root level.

3. The method of claim 2, wherein each analysis group of the root level can be associated with an analysis group that is comprised within a parent LRU tree level that is directly associated with the root level.

4. The method of claim 3, wherein the parent LRU tree level can be a child LRU tree level of a further parent LRU tree level.

5. The method of claim 4, wherein each analysis group that is comprised within a parent LRU tree level is further associated with an analysis group that is comprised within a child LRU tree level that is associated with the parent LRU tree level.

6. The method of claim 5, wherein identifying the LRU set position within the analysis group comprising the oldest MRU further comprises identifying the analysis group within the parent LRU tree sublevels that are associated with the identified root level analysis group that comprises the oldest MRU.

7. The method of claim 6, further comprising identifying the LRU position within the root level analysis group comprising the previous LRU tree level's oldest MRU set group.

8. The method of claim 7, further comprising identifying the analysis group that comprises the oldest MRU within a LRU tree level that is associated with the each identified analysis groups that comprise the oldest MRU, and identifying the LRU set within the root level analysis group.

9. A computer program product that includes a non-transitory computer readable storage medium useable by a processor, the medium having stored thereon a sequence of instructions which, when executed by the processor, causes the processor to perform a cache and memory analysis and modeling operation, by:
   receiving a cache-line set associative parameter input value;
   receiving input values in regard to a number of least recently used (LRU) tree levels that are to be analyzed;
   receiving input values in regard to a number of LRU analysis groups per LRU tree level into which a cache-line set is to be divided;
   determining whether a total of the input values for the analysis groups per LRU tree level for a cache-line set is equal to the cache-line set associative parameter input value;
   identifying an analysis group within a cache-line set for an LRU tree level of a plurality of tree levels, the cache line set comprises an oldest most recently used (MRU) for all but a root level of the LRU tree, the identifying of the analysis group based on the total of the input values for the LRU-analysis groups per LRU tree level for the cache-line set being equal to the cache-line set associative parameter input value;
   identifying a LRU set-index within a root level analysis group comprising the oldest MRU within a preceding parent LRU-tree level of the plurality of tree levels; and returning a LRU set-index for replacement that is identified by a true-LRU that is retrieved from the root level analysis group.

10. The computer program product of claim 9, wherein the root level is the final level of the LRU tree based on the LRU tree comprising at least one parent LRU tree level that is associated with the LRU tree root level.

11. The computer program product of claim 10, wherein each analysis group of the root level can be associated with an analysis group that is comprised within a parent LRU tree level that is directly associated with the root level.

12. The computer program product of claim 11, wherein the parent LRU tree level can be a child LRU tree level of a further parent LRU tree level.

13. The computer program product of claim 12, wherein each analysis group that is comprised within a parent LRU tree level is further associated with an analysis group that is comprised within a child LRU tree level that is associated with the parent LRU tree level.

14. The computer program product of claim 13, wherein identifying the LRU set position within the analysis group comprising the oldest MRU further comprises identifying the analysis group within the parent LRU tree sublevels that are associated with the identified root level analysis group that comprises the oldest MRU.

15. The computer program product of claim 14, further comprising identifying the LRU position within the root level analysis group comprising the previous LRU tree level's oldest MRU set group.

16. The computer program product of claim 15, further comprising identifying the analysis group that comprises the oldest MRU within a LRU tree level that is associated with the each identified analysis groups that comprise the oldest MRU, and identifying the LRU set within the root level analysis group.

* * * * *